US012665491B2

(12) United States Patent
Hortans et al.

(10) Patent No.: US 12,665,491 B2
(45) Date of Patent: Jun. 23, 2026

(54) HIGH POWER SYSTEM WITH ANTIPARALLEL PROTECTION DIODE ARRANGEMENT

(71) Applicant: Vacon Oy, Vaasa (FI)

(72) Inventors: Magnus Hortans, Sundom (FI); Karl Kyrberg, Vaasa (FI)

(73) Assignee: VACON OY, Vaasa (FI)

( * ) Notice: Subject to any disclaimer, the term of this patent is extended or adjusted under 35 U.S.C. 154(b) by 319 days.

(21) Appl. No.: 18/337,759

(22) Filed: Jun. 20, 2023

(65) Prior Publication Data

US 2023/0412067 A1      Dec. 21, 2023

(30) Foreign Application Priority Data

Jun. 21, 2022    (DE) ......................... 102022115348.7

(51) Int. Cl.
H02M 1/32        (2007.01)
H02M 5/458        (2006.01)

(52) U.S. Cl.
CPC ........... H02M 1/32 (2013.01); H02M 5/4585 (2013.01)

(58) Field of Classification Search
CPC ............................. H02M 1/32; H02M 5/4585

USPC .......................................................... 363/50
See application file for complete search history.

(56) References Cited

U.S. PATENT DOCUMENTS

| | | | | |
|---|---|---|---|---|
| 8,487,461 B2 * | 7/2013 | Engelhardt | ............. | H02M 1/08 |
| | | | | 290/44 |
| 2008/0304298 A1 * | 12/2008 | Toba | ...................... | H02H 7/122 |
| | | | | 363/56.01 |
| 2022/0006285 A1 * | 1/2022 | Dukaric | ................. | H02H 3/087 |

FOREIGN PATENT DOCUMENTS

DE      10 2014 117 221 A1      5/2015
WO      WO-2021160872 A1 *      8/2021      .......... H02M 7/4833

* cited by examiner

*Primary Examiner* — Yemane Mehari
(74) *Attorney, Agent, or Firm* — McCormick, Paulding & Huber PLLC

(57)        ABSTRACT

A high power system includes a common DC-bus supply with bus connections, a DC link capacitor bridging the two bus connections and at least two inverter modules connected to the DC-bus supply via the bus connections. Each inverter module includes at least one inverter cell with at least one free-wheeling diode (FWD). The inverter cells are connected to the bus connections via inverter cell connections. A protection diode arrangement is provided antiparallel to the DC link capacitor.

17 Claims, 10 Drawing Sheets

| | PHM1 | PHM2 | PHM3 | PHM4 | PHM5 | PHM6 |
|---|---|---|---|---|---|---|
| $V_{DC,min}$ (kV) | -1.4 | -1.2 | -1.0 | -0.7 | -0.6 | -3.7 |
| $I_{FWD,max}$ (kA) | 104 | 84 | 67 | 48 | 28 | 2 |
| $I^2 t_{FWD}$ (kA²s) | 1400 | 970 | 590 | 270 | 120 | 1 |
| $\Delta T_{j,FWD}$ (°C) | 425 | 325 | 225 | 125 | 55 | 0 |

DC-Kondensator
mit parasitären
Elementen

PHM1

Sammelschienen-
zustandsraum-
modell

PHM2

PHM3

Sammel-
schienen-Links

Dynamisches
FWD-Modell

PHM4

PHM5

PHM6

Phasenmodul-
Kurzschluss

|  | PHM1 | PHM2 | PHM3 | PHM4 | PHM5 | Kurzgeschlossenes Modul PHM6 |
|---|---|---|---|---|---|---|
| V DC,min (kV) | -1.4 | -1.2 | -1.0 | -0.7 | -0.6 | -3.7 |
| I FWD,max (kA) | 104 | 84 | 67 | 48 | 28 | 2 |
| I²t FWD (kA²s) | 1400 | 970 | 590 | 270 | 120 | 1 |
| ΔT j,FWD (°C) | 425 | 325 | 225 | 125 | 65 | 0 |

PHM3-Messung

| VDC(kV) | IFWD,max(kA) | I²t(FWD(kA²s) |
|---|---|---|
| 0.5 | 16 | 11 |
| 1.0 | 32 | 50 |
| 1.5 | 48 | 168 |
| 2.0 | 64 | 249 |
| 2.5 | 82 | 431 |

PHM2-Messung

| VDC(kV) | IFWD,max(kA) | I²t(FWD(kA²s) |
|---|---|---|
| 0.5 | 13 | 7 |
| 1.0 | 25 | 28 |
| 1.5 | 38 | 76 |
| 2.0 | 52 | 147 |
| 2.5 | 67 | 261 |

PHM1

PHM2

PHM3

| | PHM1 | PHM2 | PHM3 | PHM4 | PHM5 | PHM6 |
|---|---|---|---|---|---|---|
| VDC,min (kV) | -0,9 | -0,8 | -0,6 | -0,5 | -0,4 | -3,7 |
| IFWD,max(kA) | 2,3 | 2,1 | 1,6 | 9 | 7 | 0 |
| I2tFWD(kA2s) | 90 | 70 | 35 | 12 | 3 | 0 |
| ΔTj,FWD(°C) | 55 | 45 | 30 | 15 | 5 | 25 |
| I2t(PROT(kA2s) | 720 | 600 | 420 | 230 | 110 | 0 |

FWD

DC-KONDENSATOR

DC−

N

DC+

GESCHICHTETE SAMMELSCHIENEN

ZU SCHUTZDIODE a)

| VDC(kV) | IFWD,max(kA) | I2tFWD(kA2s) |
|---|---|---|
| 2.5 | 8.2 | 431 | b)

| VDC(kV) | IFWD,max(kA) | I2tFWD(kA2s) | IPROT,max(kA) | I2tPROT(kA2s) |
|---|---|---|---|---|
| 2.5 | 4.9 | 91 | 35 | 171 |

HIGH POWER SYSTEM WITH ANTIPARALLEL PROTECTION DIODE ARRANGEMENT

CROSS-REFERENCE TO RELATED APPLICATION

This application claims foreign priority benefits under 35 U.S.C. § 119 from German Patent Application No. 102022115348.7, filed Jun. 21, 2022, the content of which is hereby incorporated by reference in its entirety.

TECHNICAL FIELD

The present in invention pertains a high power system comprising a common DC-bus supply with bus connections, a DC link capacitor bridging the two bus connections and at least two inverter modules connected to the DC-bus supply via the bus connections. Each inverter module comprises at least one inverter cell with at least one free-wheeling diode (FWD). The inverter cells are connected to the bus connections via inverter cell connections. A protection diode arrangement is provided antiparallel to the DC link capacitor.

BACKGROUND

In power systems, a number of inverter modules may be connected to a common DC bus. A problem arising with known designs is that faults of the modules may propagate from one module to another. In such cases, a shorted inverter module may lead to another module being also damaged at an adjacent position of the same DC link.

Such fault propagation among inverter modules is caused by very large currents in the free-wheeling diodes of the inverter cells. These currents lead to semiconductor damage due to extensive energies and high junction temperatures of the semiconductor, i.e. the hot spot temperatures under normal running conditions.

The extensive energies mainly originate from stored DC capacitor charge.

SUMMARY

The aim of the present invention is to overcome these problems. This aim is achieved by a high power system according to claim 1. Preferable embodiments of the invention are subject of the dependent claims.

According to the invention, a high power system is provided. It comprises a common DC-bus supply with bus connections, a DC link capacitor bridging the two bus connections and at least two inverter modules connected to the DC-bus supply via the bus connections. Each inverter module comprises at least one inverter cell with at least one free-wheeling diode. The inverter cells are connected to the bus connections via inverter cell connections. According to the invention, a protection diode arrangement is provided antiparallel to the DC link capacitor.

The presently describe power systems provides protection to the inverter modules by adding protection diodes to the DC bus. By accurately designing the protection diodes across the large DC link capacitors, fault propagation may be prevented. The protection diodes are selected to not possess any significant power losses in normal running conditions. They become active only during short-time fault events. This means that passive cooling of the protection diodes is enough for keeping diode temperatures stable.

Using the present invention, modular inverter topologies and common DC bus systems may be built, without risking the propagation of inverter module failures between modules of the same common DC bus system.

In a preferred embodiment to the invention, the protection diode arrangement comprises one diode or a multitude of diodes connected in series and/or in parallel to each other.

In another preferred embodiment to the invention, the impedance to the protection diode arrangement is significantly smaller than the impedance to the inverter cell. The impedance to the protection diode arrangement may be smaller than the impedance to the inverter cell by e.g. an order of magnitude or more.

In another preferred embodiment to the invention, the impedance to the protection diode arrangement is smaller than 50%, preferably smaller than 10%, of the impedance to the inverter cell.

In another preferred embodiment to the invention, the inverter cells are one-phase or multi-phase connected at inverter cell connections.

In another preferred embodiment to the invention, a rectifier module and/or a bulk capacitor is connected at the bus connections.

In another preferred embodiment to the invention, the protection diode arrangement is sized so that its peak current and $i^2t$ capability are higher than those of the free-wheeling diode.

In another preferred embodiment to the invention, the protection diode arrangement is provided parallel to the free-wheeling diode.

BRIEF DESCRIPTION OF THE DRAWINGS

Further details and advantages of the invention will be described with reference to the figures. The figures show:

FIG. 1a: a simulation mode of six inverter modules with a short circuit between DC+ and neutral in the bottom inverter module;

FIG. 1b: simulation results of the model in FIG. 1a;

FIG. 3: equivalent circuit of simulation model of FIG. 1a;

FIG. 7a: a simulation mode of six inverter modules with a short circuit between DC+ and neutral in the bottom inverter module and protection diodes according to the invention;

FIG. 7b: simulation results of the model in FIG. 7a;

FIG. 8: equivalent circuit of simulation model of FIG. 7a;

DETAILED DESCRIPTION

The present invention pertains to the field of power systems with a common DC-bus supply, or DC link, with bus connections and at least two inverter modules. According to field and laboratory indications, if one inverter module such as a medium-voltage (MV) module shorts, other adjacent modules connected to the same DC link may be damaged, too. The adjacent phase modules may not be immediately destroyed, but when reused they will fail after a while. This issue is encountered both, in laboratory settings and at customer sites.

Although this issue was first discovered with medium-voltage inverters, this so-called "fault cascading" or "fault propagation" also applies to all low-voltage (LV) modular systems with distributed capacitances connected to the same DC link, and common DC bus-connected drives in general.

The consequences of a fault propagation from a MV one-phase module or a LV three-phase inverter may be high repair costs, limitations on redundancy and lost degrees of freedom in modular system building, mitigating risk of fault propagation by disconnecting DC links, which in return may lead to other challenges. In particular, the inverters or phase modules may not be connected to the same DC link as the failure of one of the inverters or phase modules may lead to the blowing up of the whole system. Therefore, constructing larger systems which require a common DC link becomes more difficult. The present invention makes it possible to overcome these problems. Also, as it is becoming more common to provide systems with DC distribution, the present invention ensures that destructive chain reactions under fault conditions are prevented.

Figures 1A, 1B:
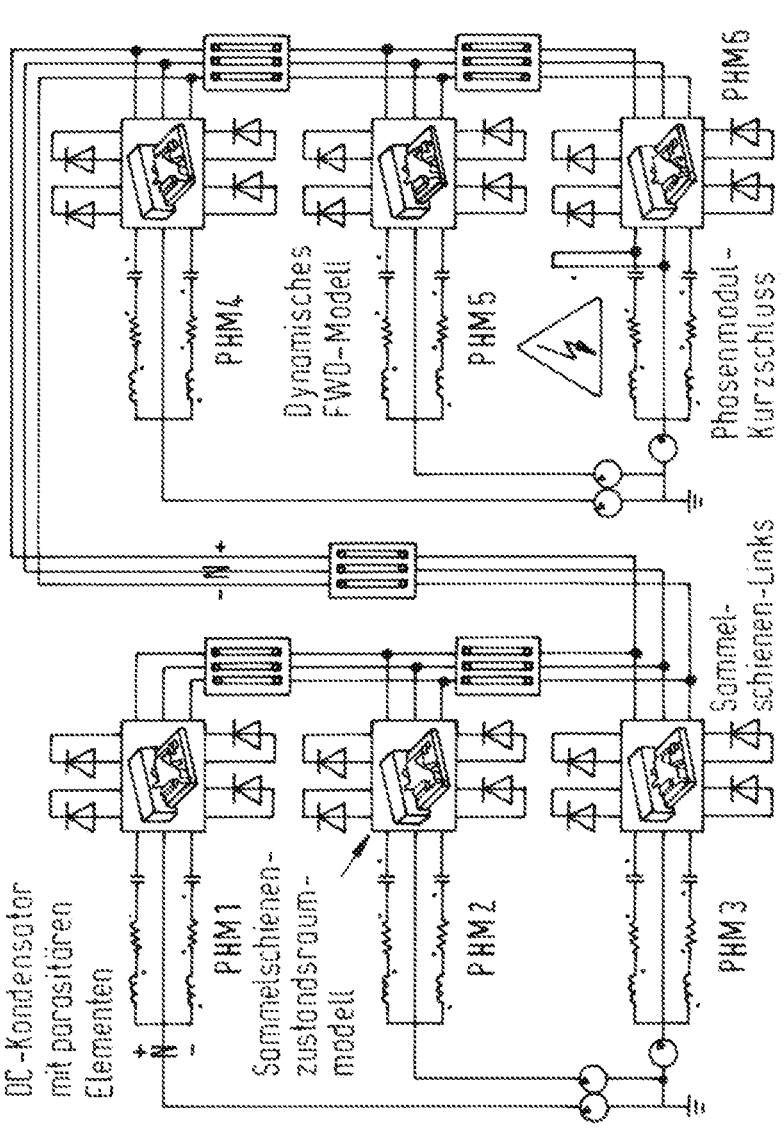

FIG. 1a shows a simulation of the described problematic behaviour of a power system. Here, six MV inverter modules PHM1 to PHM6 are shown in power systems. A fault is indicated at PHM6. It has been found that the fault propagation among MV phase modules is caused by very large currents in the free-wheeling diodes FWD, leading to semiconductor damage due to extensive energies and high junction temperatures.

FIG. 1a and FIG. 1b present a simulation example in which an ideal short circuit takes place at a DC link to which the six MV phase inverter modules PHM1 to PHM6 are connected. The inverter modules PHM1 to PHM6 are stacked on top of each other with a short circuit between DC+ and neutral in the lowermost phase module PHM6. FIG. 1b gives the simulation results of the model in FIG. 1a with maximum permissible DC link voltage of 4.0 kV The maximum allowable FWD I²t value for the semiconductor module of the exemplary invert-er module PHM6 may be 470 kA²s at a time $t_p$=10 ms and a junction temperature of $T_{vj}$=125° C. The simulated I²t values of PHM1, PHM2, and PHM3 exceed this value and said components are thus damaged. However, as the FWD power injection happens in a very short time span of $t_p$<<10 ms, the free-wheeling diodes in PHM4 will most likely also be impaired. In this example, PHM6 is destroyed by its internal short circuit.

Figures 2A, 2B, 2C:
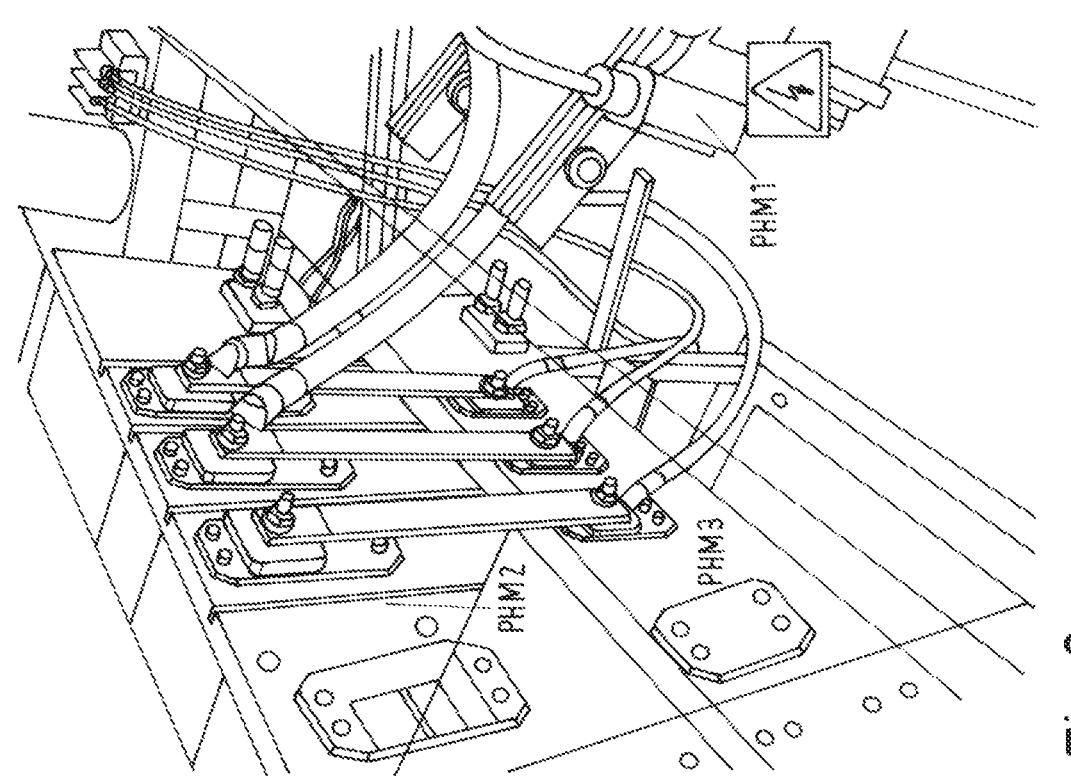
FIG. 2: laboratory measurement confirming free-wheeling diode damaging in short circuit even.

Impairment of free-wheeling diodes suffering from extensive energies due to fault propagation has furthermore been verified by laboratory experiments. FIG. 2 shows laboratory measurements confirming free-wheeling diode damaging in short circuit events. Three MV phase mod-ules PHM 1 to PHM 3 are connected to the same DC link. PHM1 is short-circuited and currents through FWDs of PHM2 and PHM3 are measured with DC voltage increments of 500V. The test is stopped already at 2.5 kVDC as allowable FWD I²t values are exceeded.

Figure 3:
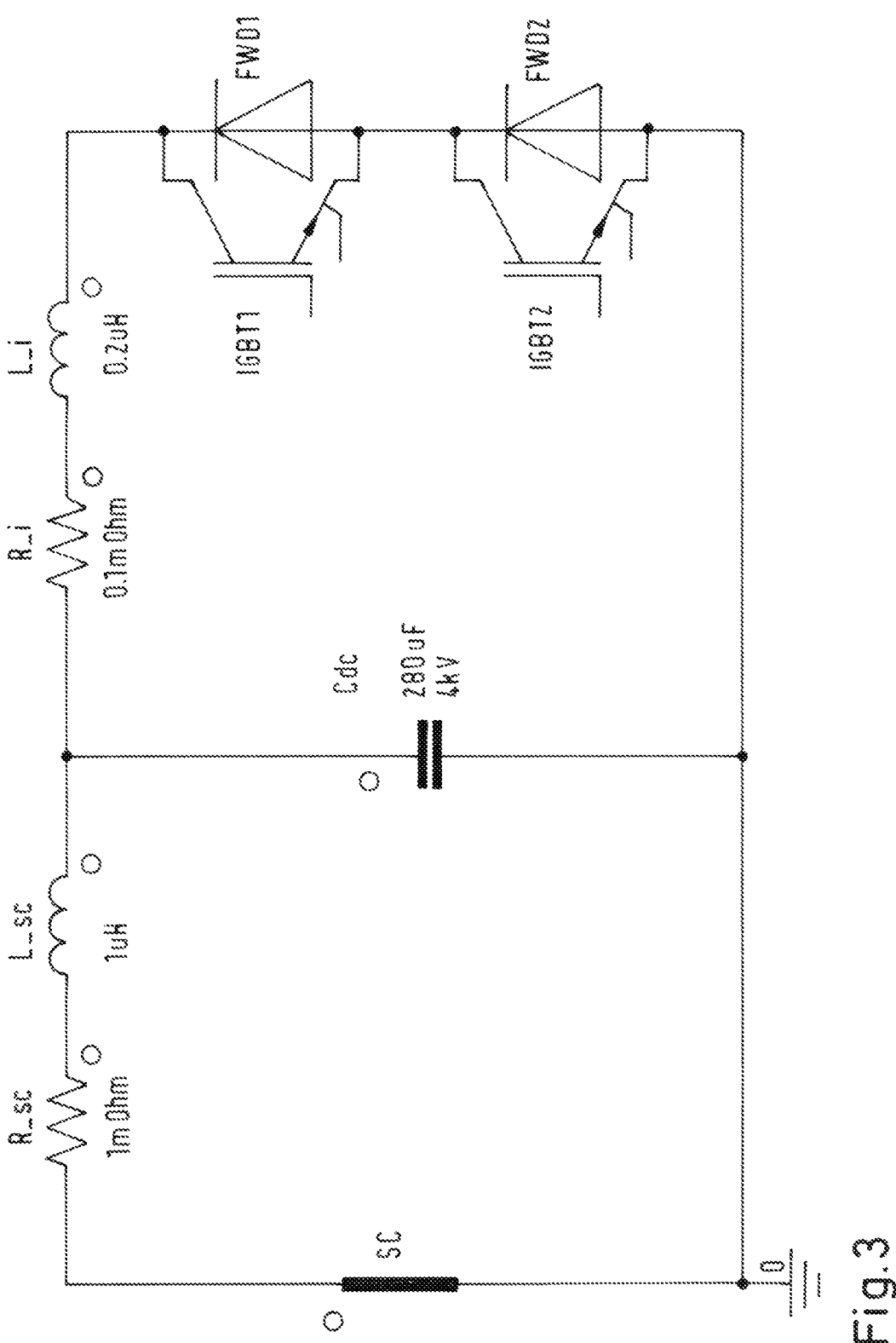
Figure 4:
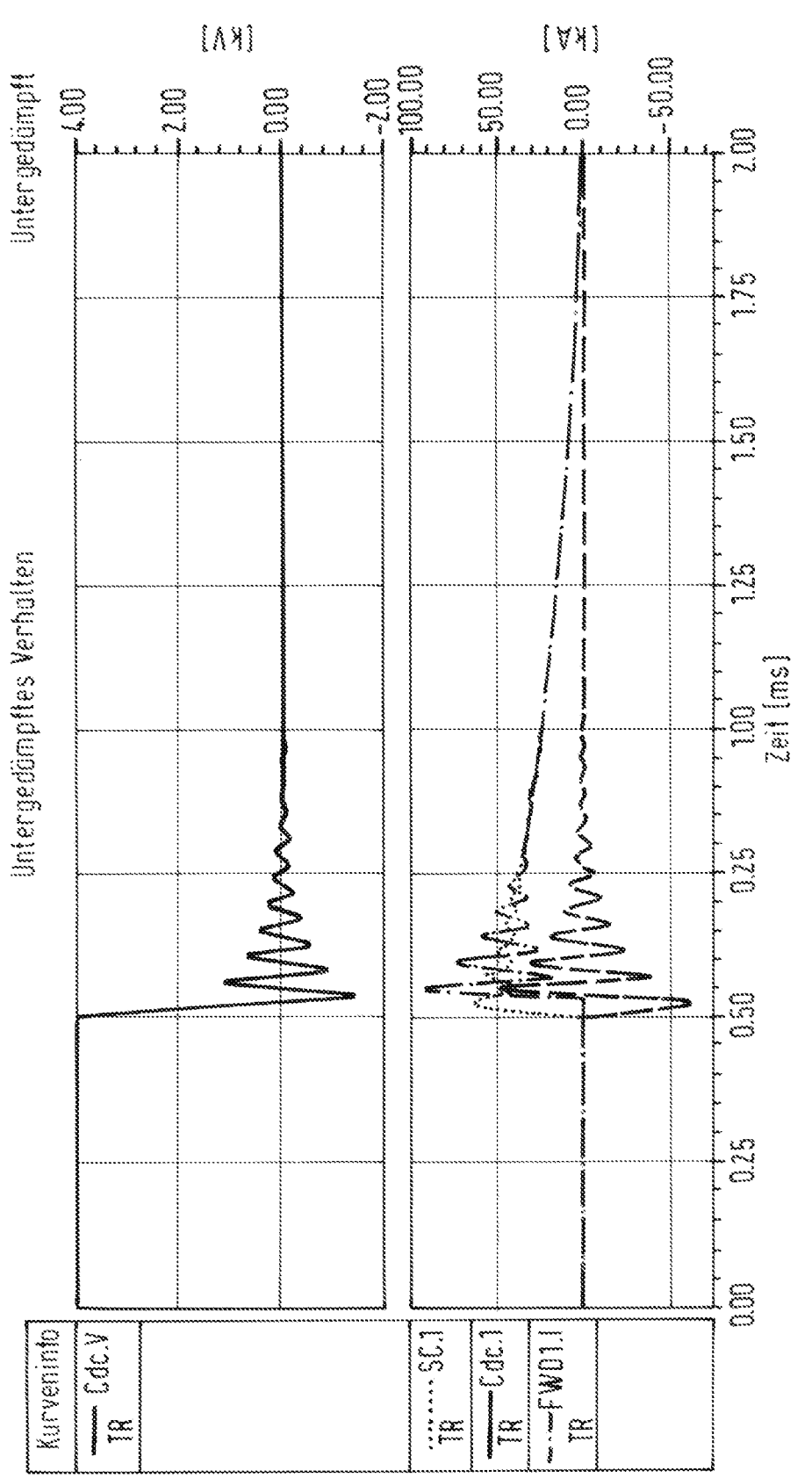
FIG. 4: simulation results when bottom inverter shorts.

FIG. 3 shows an equivalent circuit of the simulation model of FIG. 1a. It clarifies why the free-wheeling diodes in adjacent phase or inverter modules are exposed to such large energies, ultimately leading to semiconductor destruction. The simulation model of FIG. 1a is broken down into an equivalent circuit of PHM1 experiencing a short circuit in PHM6. FIG. 4 shows the corresponding simulation results when PHM6 shorts. Here, the FWD I²t is equal to 860 kA²s, which increases if $R_{SC}$ is smaller, e.g. $R_{SC}$=0.1 mΩ results in FWD I²t of =1500 kA²s.

Figure 5:
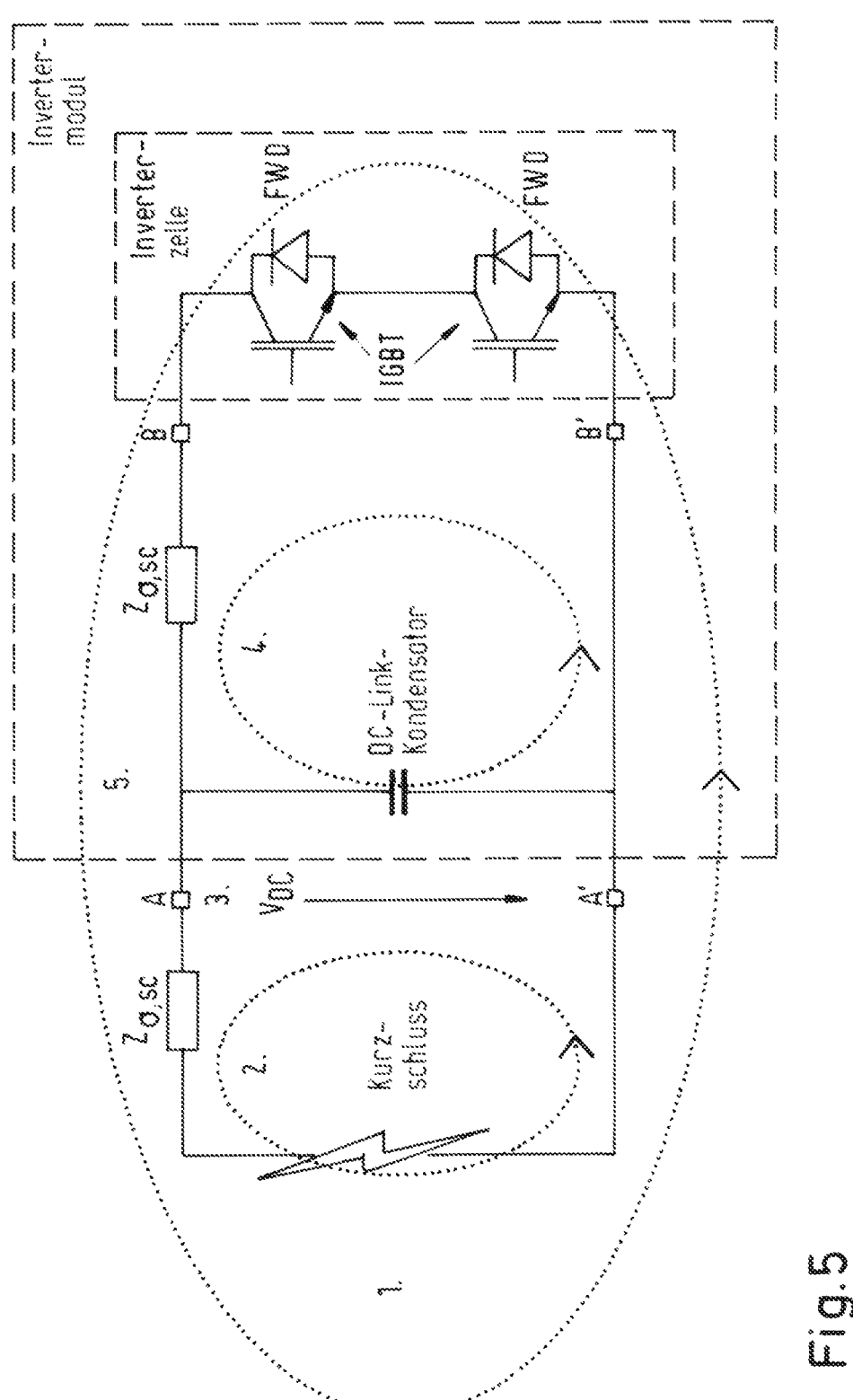
FIG. 5: equivalent circuit of shorted simulation model.

FIG. 5 shows the equivalent circuit of the shortened simulation model. Its design and simulation results can be explained as follows. The inverter modules PHM1 to PHM 6 can be one or more inverters connected at A and A'. The inverter cell can be one-phase or multi-phase connected at B and B'. The inverter cell may be a two-level or multi-level cell and may include other semiconductor switches than the IGBTs shown in FIG. 5. Rectifier modules, bulk capacitors and/or further components may be connected at A and A'. Impendence $Z_{o,sc}$ is the total impedance between inverter module and short circuit. $Z_{o,i}$ is the total impedance for the DC link capacitor-inverter cell loop. This also represents semiconductor forward voltages.

A typical failure situation at a high power system may happen as follows. In a first step, a short circuit may take place in the charged DC link. In a second step, the DC link capacitor will dis-charge into the short circuit. The short circuit impedance $Z_{o,sc}$ is predominantly inductive in nature and the capacitor current will charge this stray inductance. The capacitances and stray inductances of this loop consti-tute a 2nd order underdamped system and the capacitor voltage $V_{DC}$ undershoots zero, thereby reversing the voltage polarity. The free-wheeling diodes FWD in the inverter cell will start to conduct the capacitor current due to DC link voltage reversal. Then, the energy stored in the short circuit impedance $Z_{o,sc}$ will also force its current through the freewheeling diodes FWD. The capacitor voltage $V_{DC}$ as well as the capacitor current will dynamically oscillate about zero due to the 2nd order behaviour. The free-wheeling diodes FWD will however still conduct current as the short circuit current creates an offset about which the free-wheel-ing diode FWD current oscillates. If the offset due to RLC-ratio is not present or large enough, then the semicon-ductors could hypothetically also be damaged from switch-ing rapidly on and off. The free-wheeling diodes will thus stay conductive throughout the complete fault event, causing high currents and energies and possibly leading to diode destruction. The presently described steps may occur at least partially simultaneously.

Figure 6:
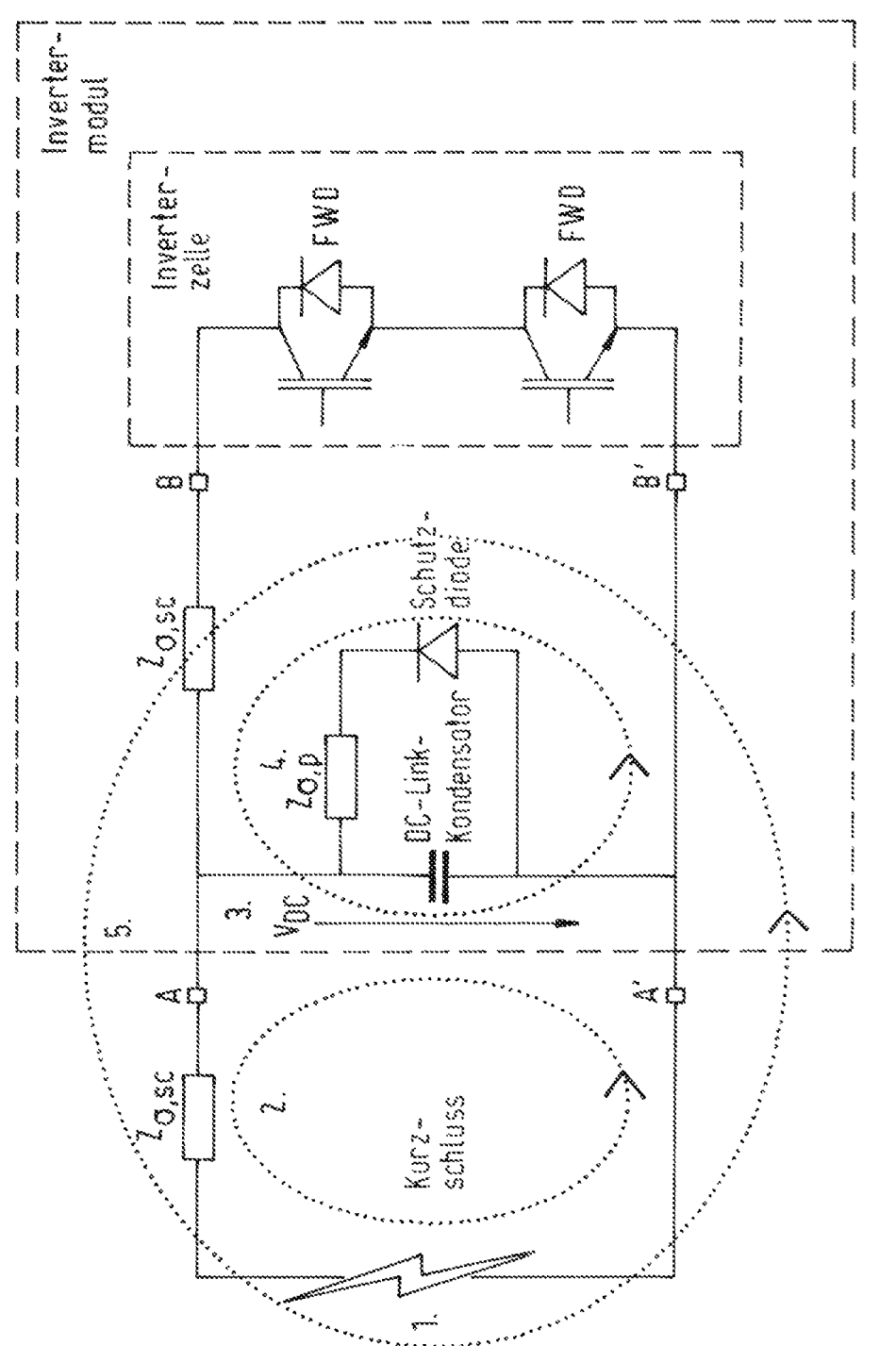
FIG. 6: equivalent circuit of shorted model according to the invention.

FIG. 6 shows an equivalent circuit of a shorted power system according to the invention. It is similar to the known power system described with reference to FIG. 5. It com-prises all of the components shown in FIG. 5 such as a common DC-bus supply with bus connections A, A', a DC link capacitor bridging the two bus connections A, A' and at least two inverter modules connected to the DC-bus supply via the bus connections A, A'.

The number of inverter modules may be selected to suit the given application. Each inverter module comprises at least one inverter cell with at least one free-wheeling diode FWD. Again, the number of inverter cells and free-wheeling diodes FWD may be selected for the given application. The present invention may therefore be easily scalable for dif-ferent power regimes by simply adjusting the number of required inverter modules.

In FIG. 6, only one inverter module is shown for clarity's sake. Its inverter cell is connected to the bus connections A, A' via inverter cell connections B, B'. The inverter cell comprises two free-wheeling diodes in series and two semi-conductor switches in parallel to each of the free-wheeling diodes. The present invention's power system therefore comprises a protection diode arrangement provided antipar-allel to the DC link capacitor. This diode arrangement can consist of series and/or parallel connected diodes.

In contrast to the previously described failure situation, a failure situation of the invention's high power system occurs as follows: In a first step, a short circuit takes again place in the charged DC link. In a second step, the DC link capacitor will discharge into the short circuit. The short circuit impedance $Z_{\sigma,sc}$ is predominantly inductive and the capacitor current will charge this stray inductance. The capacitances and stray inductances of this loop constitute a 2nd order system and the capacitor voltage polarity reverses. The impedance to the protection diode $Z_{\sigma,p}$ is ideally significantly smaller than the impedance to the inverter cell $Z_{\sigma,i}$ and once the DC link voltage starts to reverse, the protection diode will start to conduct and thus clamp the capacitor current. The short circuit current will be clamped by the protection diode, thus reducing the current through the free-wheeling diodes FWD and preventing damage of the FWDs.

A measure for the current stress of the FWDs can be the $I^2t$ value or peak current. The aim is to reduce either $I^2t$ value, peak current or both. $I^2t$ or peak current stress can be transferred to the additional protection diodes. The higher the ratio of $Z_{\sigma,i}$ to $Z_{\sigma,p}$, the better the FWDs are protected from detrimental effects resulting from reverse currents. For achieving the best protective effect, $Z_{\sigma,i}$ must be selected to be much greater than $Z_{\sigma,p}$. In this case, the fault current mostly flows through the protection diode and not through the FWD.

The protection diode can be sized so that its peak current and $I^2t$ capability are higher than those of the FWDs. The impedances $Z_{\sigma,i}$ and $Z_{\sigma,p}$ are predominantly inductive, but also contain resistive parts. The non-linear diode impedance corresponding to the forward voltage drop is included in $Z_{\sigma,i}$ respectively $Z_{\sigma,p}$.

Figures 7A, 7B:
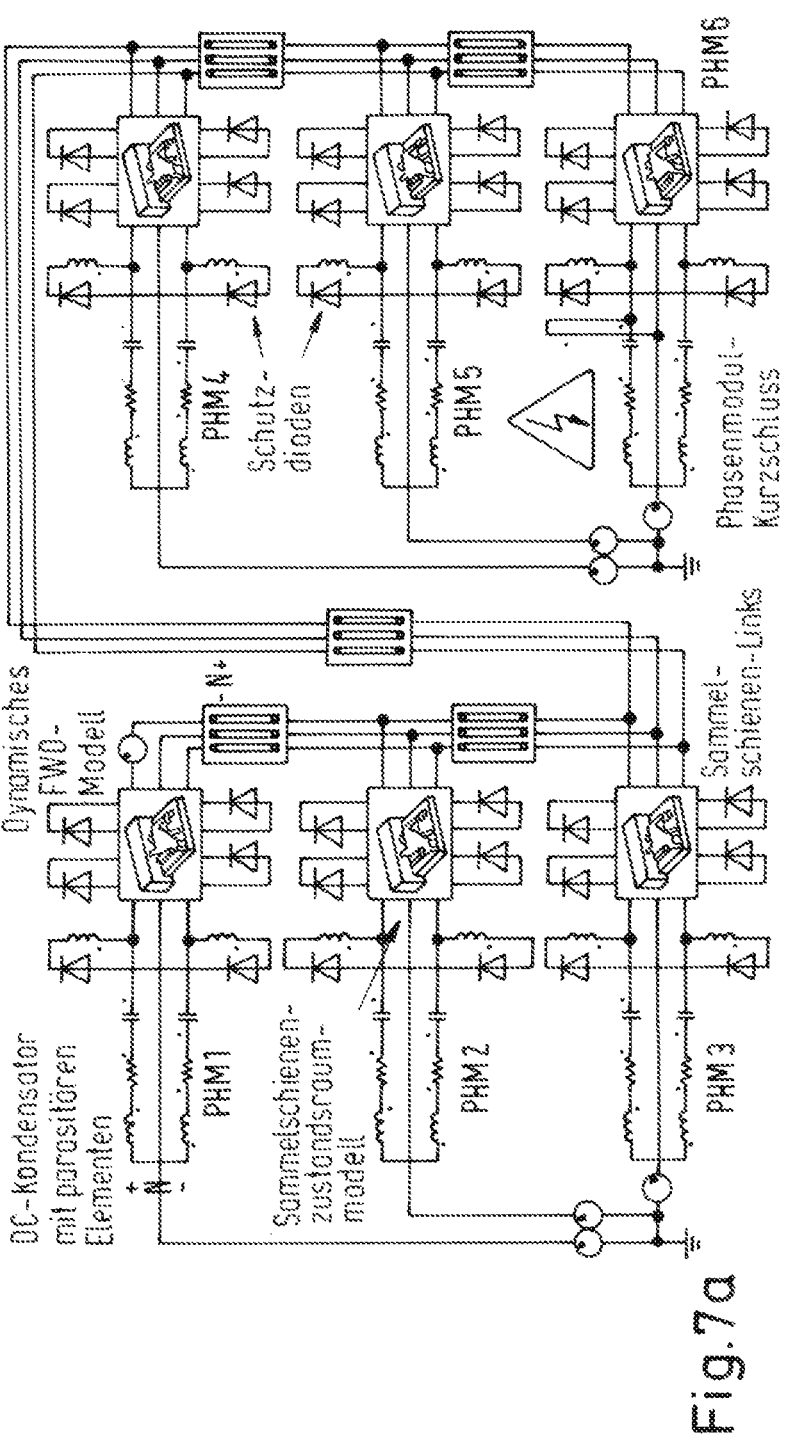

FIG. 7a is a simulation model of the invention's device with six phase modules stacked on top of each other and a short circuit taking place between DC+ and neutral in the lowermost phase module PHM6. Protection diodes with small loop stray inductance of e.g. 50 nH are added across all DC link capacitors. The added protection diodes are the major difference between the present invention and the prior art shown in FIG. 1a.

FIG. 7b shows simulation results of the model of FIG. 7a with maximum permissible DC link voltage of 4.0 kV. The protection diodes may be modelled according to available diode characteristics.

Adding protection diodes across all DC capacitors prevents the FWDs from being exposed to harmful energies. In the example above, the stray inductance of the protection diode loop is roughly ¼ of the FWD loop inductance, i.e. 50 nH vs. 200 nH. This causes the protection diode to dissipate most energy of the PHM capacitor which in the case of this DC+ to neural short circuiting equals $$E_C = \frac{1}{2}CV^2 = \frac{1}{2} \cdot 280uF \cdot (4kV)^2 = 2.2kj$$

The maximum capacitor energy EC may be used to dimension the protection diodes accurately. The energy to be dissipated by the protection diodes decreases as $\leq(I2t)/n$, where n is the number of symmetrically paralleled diodes. The final $I^2t$ values for the diodes depend on the impedance sharing between the available discharge loops. This means using two paralleled protection diodes in the example above results in a maximum energy value proportional to $I^2t_{PROT}$ $(kA^2s) \leq 720/2 = 360$.

Figure 8:
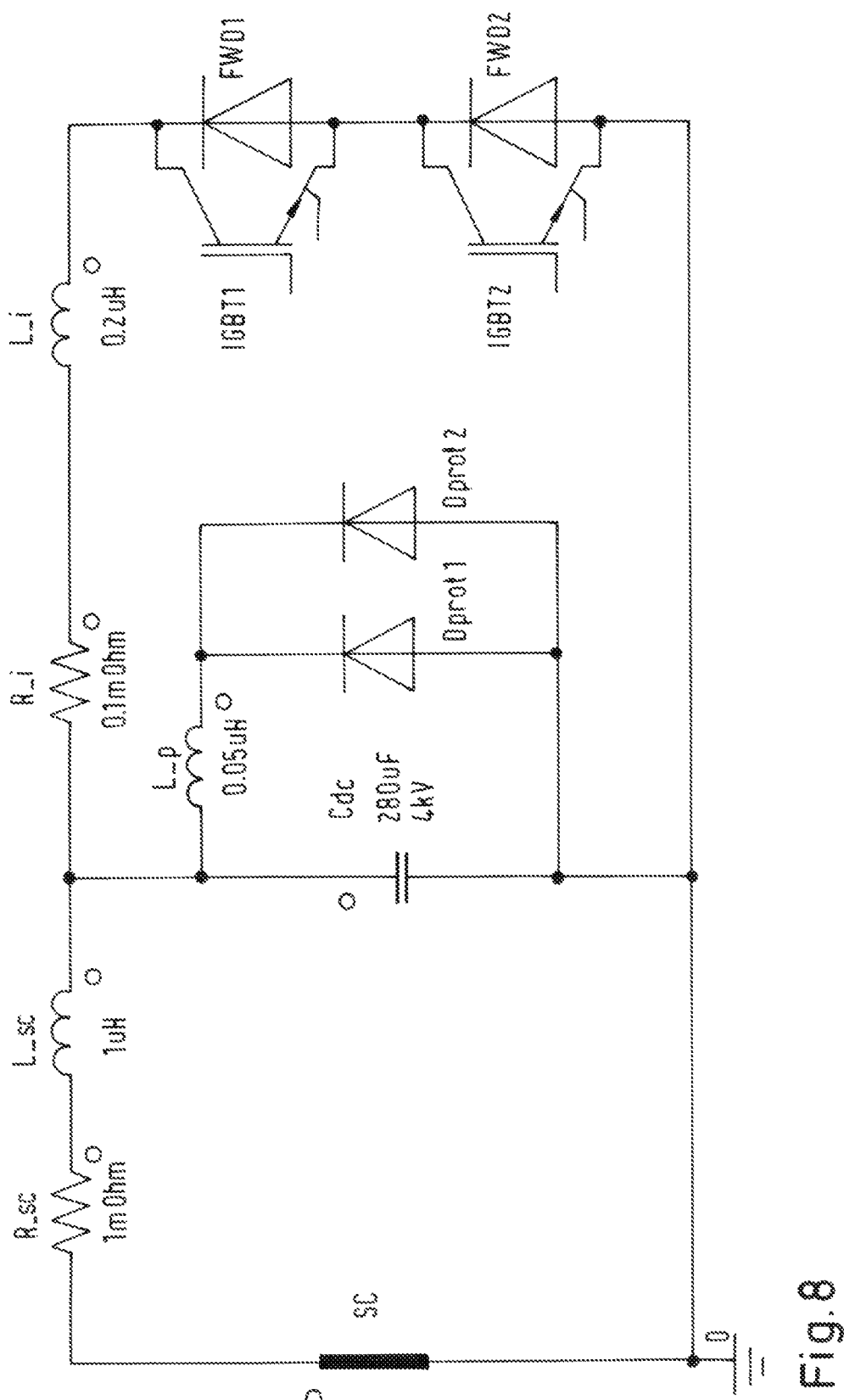
Figures 9A, 9B:
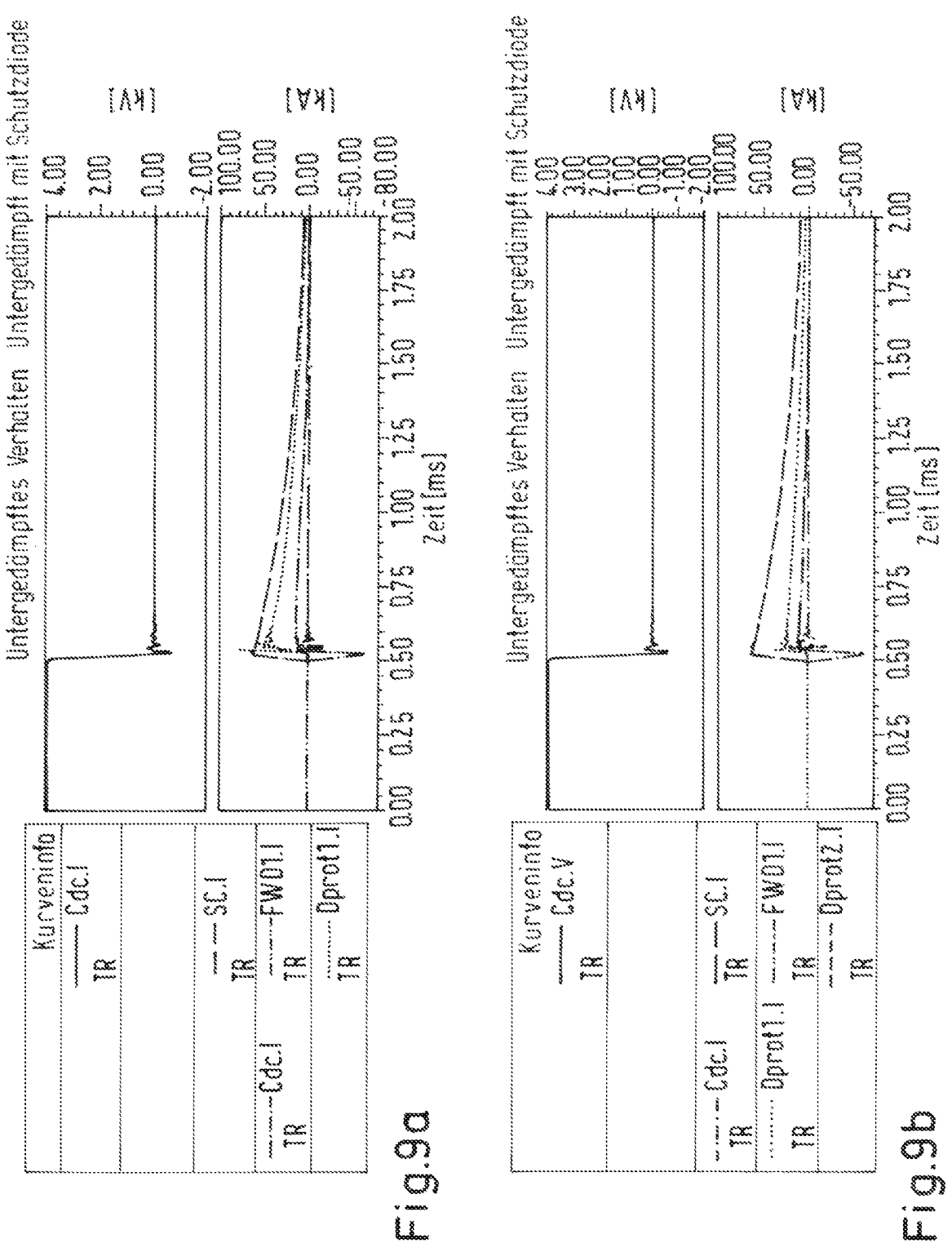
FIG. 9a: simulation results of the model in FIG. 7a when bottom inverter shorts with two protection diode.
FIG. 9b: simulation results of the model in FIG. 7a when bottom inverter shorts with one protection diodes.
Figure 10A:
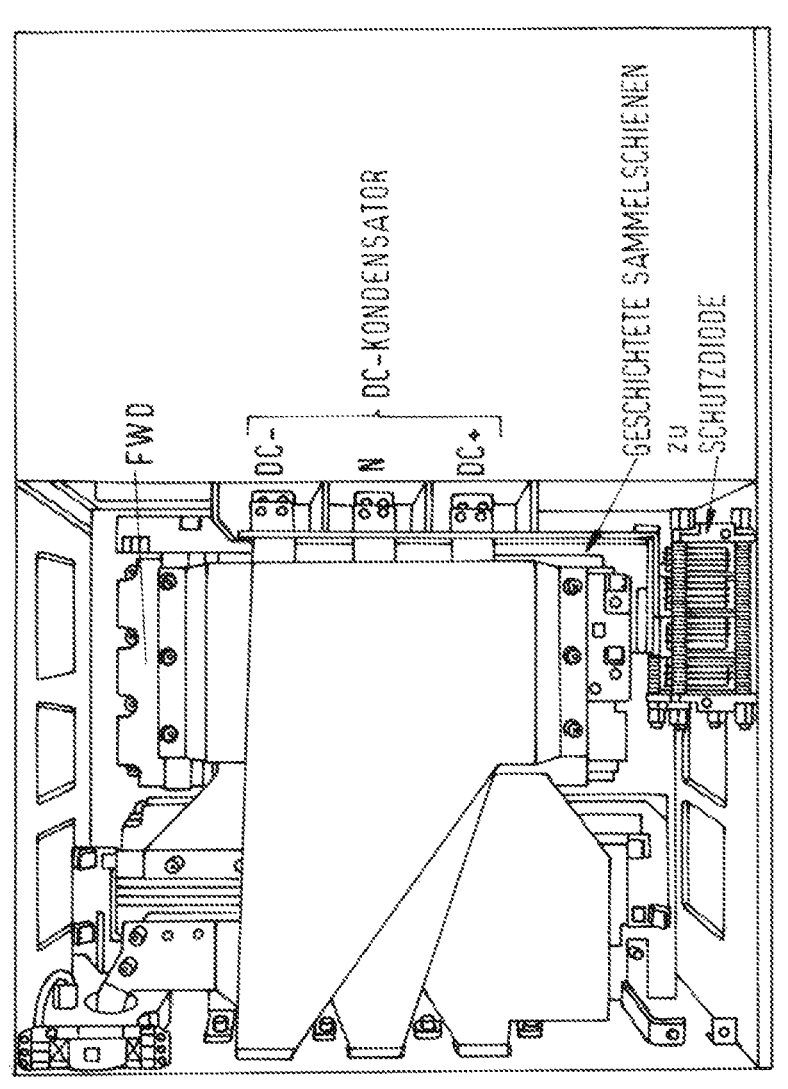
FIG. 10: measurement results of prototype design with two paralleled protection diodes in converter module.
Figure 10B:
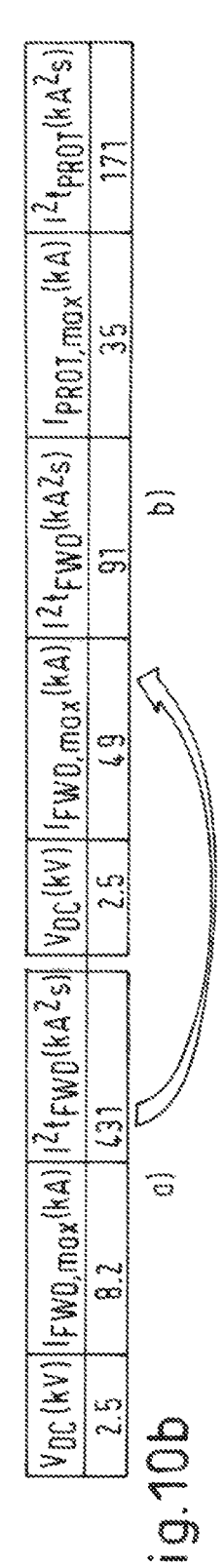

The equivalent circuit of PHM1 with the highest diode energies in FIG. 7a is illustrated in FIG. 8. Corresponding simulation results are shown in FIG. 9a, when PHM6 shorts with one protection diode. This leads to $I^2tD_{prot}=720$ kA². According to FIG. 9b, shorting occurs with two protection diodes, leading to $I^2tD_{prot}=270$ kA²s and a ratio of 2.7x. The simulations may easily be verified by a setup with protection diodes integrated into the MV phase modules.

The present invention may be used with different power systems such as MV one-phase inverter modules, MV three-phase stacked inverter modules, LV modular inverter modules and all common DC bus systems.

In medium voltage drives, the protection diodes may be put across all large capacitors in the common DC link if their stored energy exceeds ¼ of the allowed diode energies, i.e. proportional to the I2t values. The inverter FWDs may be selected to dissipate the energy of smaller capacitors, like e.g. snubber capacitors.

In low-voltage drives, protection diodes may be put across all large capacitors in the common DC link if their stored energy exceeds ¼ of the allowed diode energies. If the protection diode solution is not feasible on its own, then increased system dampening may be used to allow for energy dissipation externally to the inverter unit rather than in the free-wheeling diodes.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A high power system comprising a common DC-bus supply with bus connections, a DC link capacitor bridging the two bus connections and at least two inverter modules connected to the DC-bus supply via the bus connections, each inverter module comprising at least one inverter cell with at least one free-wheeling diode, wherein the inverter cells are connected to the bus connections via inverter cell connections, wherein a protection diode arrangement is provided anti-parallel to the DC link capacitor, and wherein the impedance to the protection diode arrangement $(Z_{\sigma,p})$ is significantly smaller than the impedance to the inverter cell $(Z_{\sigma,i})$.

2. The high power system according to claim 1, wherein the protection diode arrangement comprises one diode or a multitude of diodes connected in series and/or in parallel to each other.

3. The high power system according to claim 1, wherein the impedance to the protection diode arrangement $(Z_{\sigma,p})$ is smaller than 50%, preferably smaller than 10%, of the impedance to the inverter cell $(Z_{\sigma,i})$.

4. The high power system according to claim 1, wherein the inverter cells are one-phase or multi-phase connected at inverter cell connections.

5. The high power system according to claim 1, wherein a rectifier module and/or a bulk capacitor is connected at the bus connections.

6. The high power system according to claim 1, wherein the protection diode arrangement is sized so that its peak current and $i^2t$ capability are higher than those of the free-wheeling diode.

7. The high power system according to claim 1, wherein the protection diode arrangement is provided parallel to the free-wheeling diode.

8. The high power system according to claim 2, wherein the inverter cells are one-phase or multi-phase connected at inverter cell connections.

9. The high power system according to claim 3, wherein the inverter cells are one-phase or multi-phase connected at inverter cell connections.

10. The high power system according to claim 2, wherein a rectifier module and/or a bulk capacitor is connected at the bus connections.

11. The high power system according to claim 3, wherein a rectifier module and/or a bulk capacitor is connected at the bus connections.

12. The high power system according to claim 4, wherein a rectifier module and/or a bulk capacitor is connected at the bus connections.

13. A high power system comprising a common DC-bus supply with bus connections, a DC link capacitor bridging the two bus connections and at least two inverter modules connected to the DC-bus supply via the bus connections, each inverter module comprising at least one inverter cell with at least one free-wheeling diode, wherein the inverter cells are connected to the bus connections via inverter cell connections, wherein a protection diode arrangement is provided anti-parallel to the DC link capacitor, and wherein the protection diode arrangement is sized so that its peak current and $i^2t$ capability are higher than those of the free-wheeling diode.

14. The high power system according to claim 13, wherein the protection diode arrangement comprises one diode or a multitude of diodes connected in series and/or in parallel to each other.

15. The high power system according to claim 13, wherein an impedance to the protection diode arrangement ($Z_{o,p}$) is smaller than 50%, preferably smaller than 10%, of an impedance to the inverter cell ($Z_{o,i}$).

16. The high power system according to claim 13, wherein the inverter cells are one-phase or multi-phase connected at inverter cell connections.

17. The high power system according to claim 13, wherein a rectifier module and/or a bulk capacitor is connected at the bus connections.

* * * * *